United States Patent
Cui et al.

(10) Patent No.: US 10,373,609 B2
(45) Date of Patent: Aug. 6, 2019

(54) VOICE RECOGNITION METHOD AND APPARATUS

(71) Applicant: BAIDU ONLINE NETWORK TECHNOLOGY (BEIJING) CO., LTD., Beijing (CN)

(72) Inventors: Weiwei Cui, Beijing (CN); Yu Sun, Beijing (CN)

(73) Assignee: BAIDU ONLINE NETWORK TECHNOLOGY (BEIJING) CO., LTD., Beijing (CN)

( * ) Notice: Subject to any disclaimer, the term of this patent is extended or adjusted under 35 U.S.C. 154(b) by 118 days.

(21) Appl. No.: 15/619,252

(22) Filed: Jun. 9, 2017

(65) Prior Publication Data
US 2018/0190280 A1 Jul. 5, 2018

(30) Foreign Application Priority Data
Dec. 29, 2016 (CN) .......................... 2016 1 1244370

(51) Int. Cl.
G10L 15/22 (2006.01)
G10L 15/00 (2013.01)
(Continued)

(52) U.S. Cl.
CPC ............ G10L 15/063 (2013.01); G10L 15/02 (2013.01); G10L 15/16 (2013.01); G10L 15/20 (2013.01); G10L 2021/02082 (2013.01)

(58) Field of Classification Search
CPC combination set(s) only.
See application file for complete search history.

(56) References Cited

U.S. PATENT DOCUMENTS

| 5,434,912 A | * | 7/1995 | Boyer | H04M 9/08 379/202.01 |
| 6,049,607 A | * | 4/2000 | Marash | H04R 3/005 379/406.08 |

(Continued)

FOREIGN PATENT DOCUMENTS

CN 105304093 A 2/2016

OTHER PUBLICATIONS

Han et al., "Deep Learning for Speech Recognition, Deep Learning Theory and Application Seminar IV, Talk 7," Journal of Military Communication Technology, vol. 37, pp. 91-97, Sep. 2016.
(Continued)

*Primary Examiner* — Shreyans A Patel
(74) *Attorney, Agent, or Firm* — Marshall, Gerstein & Borun LLP (57) ABSTRACT

The present application discloses a voice recognition method and apparatus. A specific implementation of the method includes: in response to detecting a microphone receiving voice signal containing interfering sound signal, performing high-pass filtering on the voice signal; cancelling the interfering sound signal in the voice signal subjected to high-pass filtering; performing automatic gain control on the voice signal subjected to cancelling the interfering sound signal, to obtain target voice signal; and extracting a feature vector from the target voice signal and inputting the feature vector into a pre-trained acoustic model, to obtain a voice recognition result matching the target voice signal, the acoustic model being used for representing a corresponding relationship between the feature vector and the voice recognition result. This implementation improves the success rate of voice recognition.

15 Claims, 5 Drawing Sheets

(51) Int. Cl.
  *G10L 15/06* (2013.01)
  *G10L 15/16* (2006.01)
  *G10L 15/02* (2006.01)
  *G10L 21/0208* (2013.01)
  *G10L 15/20* (2006.01)

(56) References Cited

U.S. PATENT DOCUMENTS

| | | | | |
|---|---|---|---|---|
| 6,363,344 | B1* | 3/2002 | Higuchi | G10L 21/0208 379/388.04 |
| 2002/0103639 | A1* | 8/2002 | Chang | G10L 15/065 704/223 |
| 2002/0136417 | A1* | 9/2002 | Ku | H03G 3/00 381/94.1 |
| 2008/0101622 | A1* | 5/2008 | Sugiyama | H04M 9/082 381/66 |
| 2013/0297299 | A1* | 11/2013 | Chakrabartty | G10L 15/02 704/211 |
| 2014/0270150 | A1* | 9/2014 | Garcia | H04M 3/002 379/406.08 |
| 2015/0126255 | A1* | 5/2015 | Yang | G10L 21/0208 455/570 |

OTHER PUBLICATIONS

Yang et al., "Sensor and Measuring Technology," Aviation Industry Press, p. 196, 2012.

Deng et al., "Deep Learning Method and Application," Mechanic Industry Press, pp. 39, 40 and 66-68, Mar. 2016.

Huang, X., "Multimedia Technology," Beijing Post and Communication University Press, pp. 222-223, Feb. 2010.

\* cited by examiner

VOICE RECOGNITION METHOD AND APPARATUS

CROSS-REFERENCE TO RELATED APPLICATION

This application claims the priority of Chinese Patent Application No. 201611244370.5, entitled "Voice Recognition Method and Apparatus," filed on Dec. 29, 2016, the content of which is incorporated herein by reference in its entirety.

TECHNICAL FIELD

The present application relates to the field of computer technology, specifically to the field of Internet technology, and more specifically to a voice recognition method and apparatus.

BACKGROUND

With the development of computer technologies, voice recognition technologies have been applied in more and more areas, such as smart home, industrial control, and voice interaction systems of terminal devices. Information can be processed and acquired more conveniently with the voice recognition technologies, thereby improving working efficiency of users.

However, existing voice recognition methods usually include inputting a voice signal to be recognized into an acoustic model obtained by training a pure voice signal, to obtain a voice recognition result. Since the voice signal to be recognized usually differ significantly from the pure voice signal, such voice recognition methods have the problem of low recognition success rate.

SUMMARY

An objective of the present application is to provide an improved voice recognition method and apparatus, in order to solve the technical problem mentioned in the foregoing Background section.

According to a first aspect, the present application provides a voice recognition method, the method comprising: performing high-pass filtering on a voice signal, in response to detecting the microphone receiving the voice signal containing interfering sound signal; cancelling the interfering sound signal in the voice signal subjected to high-pass filtering; performing automatic gain control on the voice signal subjected to cancelling the interfering sound signal, to obtain target voice signal; and extracting a feature vector from the target voice signal and inputting the feature vector into a pre-trained acoustic model, to obtain a voice recognition result matching the target voice signal, the acoustic model being used for representing a corresponding relationship between the feature vector and the voice recognition result.

In some embodiments, the terminal device is further equipped with a loudspeaker, the interfering sound signal comprises an echo signal and a noise signal, and the echo signal is a sound signal sent by the loudspeaker and transmitted to the microphone.

In some embodiments, the cancelling the interfering sound signal in the voice signal to obtain target voice signal comprises: performing adaptive filtering on the voice signal subjected to high-pass filtering using a time delay estimation algorithm, to cancel the echo signal; and cancelling the noise signal in the voice signal subjected to adaptive filtering using a noise suppression algorithm In some embodiments, before the performing high-pass filtering on the voice signals, in response to detecting the microphone receiving the voice signal, the method further comprises: pre-processing a pre-acquired training sample to generate a target training sample, the target training sample comprising a voice identifier; extracting the feature vector from the target training sample; and training, using a convolutional neural network, a deep neural network, and a restricted Boltzmann machine, and assigning the feature vector extracted from the target training sample as an input and the voice identifier as an output, to obtain the acoustic model.

In some embodiments, the pre-processing a pre-acquired training sample to generate a target training sample comprises: performing high-pass filtering on the pre-acquired training sample; performing sequentially echo cancellation and noise suppression on the training sample subjected to high-pass filtering; and performing automatic gain control on the training sample subjected to noise suppression, to generate the target training sample.

In some embodiments, before the performing high-pass filtering on the voice signals, in response to detecting the microphone receiving a voice signal, the method further comprises: clustering the voice identifier outputted by the acoustic model using a clustering algorithm, and determining voice identifier obtained after clustering as a voice recognition result matching the training sample.

According to a second aspect, the present application provides a voice recognition apparatus, the apparatus comprising: a first processing unit, configured to perform high-pass filtering on the voice signal, in response to detecting the microphone receiving voice signal containing interfering sound signal; a cancellation unit, configured to cancel the interfering sound signal in the voice signal subjected to high-pass filtering; a second processing unit, configured to perform automatic gain control on the voice signal subjected to cancelling the interfering sound signal, to obtain target voice signal; and an input unit, configured to extract a feature vector from the target voice signal and input the feature vector into a pre-trained acoustic model, to obtain a voice recognition result matching the target voice signal, the acoustic model being used for representing a corresponding relationship between the feature vector and the voice recognition result.

In some embodiments, the terminal device is further equipped with a loudspeaker, the interfering sound signal comprises an echo signal and a noise signal, and the echo signal is a sound signal sent by the loudspeaker and transmitted to the microphone.

In some embodiments, the cancellation unit comprises: first cancellation module, configured to perform adaptive filtering on the voice signal subjected to high-pass filtering using a time delay estimation algorithm, to cancel the echo signal; and a second cancellation module, configured to cancel the noise signal in the voice signal subjected to adaptive filtering using a noise suppression algorithm.

In some embodiments, the apparatus further comprises: a pre-processing unit, configured to pre-process a pre-acquired training sample to generate a target training sample, the target training sample comprising a voice identifier; an extraction unit, configured to extract the feature vector from the target training sample; and a training unit, configured to train, using a convolutional neural network, a deep neural network, and a restricted Boltzmann machine, and assigning the feature vector extracted from the target training sample as an input and the voice identifier as an output, to obtain the acoustic model.

In some embodiments, the pre-processing unit comprises: a first processing module, configured to perform high-pass filtering on the pre-acquired training sample; a second processing module, configured to perform sequentially echo cancellation and noise suppression on the training sample subjected to high-pass filtering; and a third processing module, configured to perform automatic gain control on the training sample subjected to noise suppression, to generate the target training sample.

In some embodiments, the apparatus further comprises: a clustering unit, configured to cluster the voice identifier outputted by the acoustic model using a clustering algorithm, and determine a voice identifier obtained after clustering as a voice recognition result matching the training sample.

According to the voice recognition method and apparatus provided in the present application, high-pass filtering, cancellation of interfering sound signals, and automatic gain control are sequentially performed on a voice signal, to obtain a target voice signal, and afterwards, a feature vector is extracted from the target voice signal, and the feature vector is inputted into a pre-trained acoustic model, to obtain a voice recognition result matching the target voice signal, thereby improving the success rate of voice recognition.

BRIEF DESCRIPTION OF THE DRAWINGS

Other features, objectives and advantages of the present application will become more apparent upon reading the detailed description to non-limiting embodiments with reference to the accompanying drawings.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
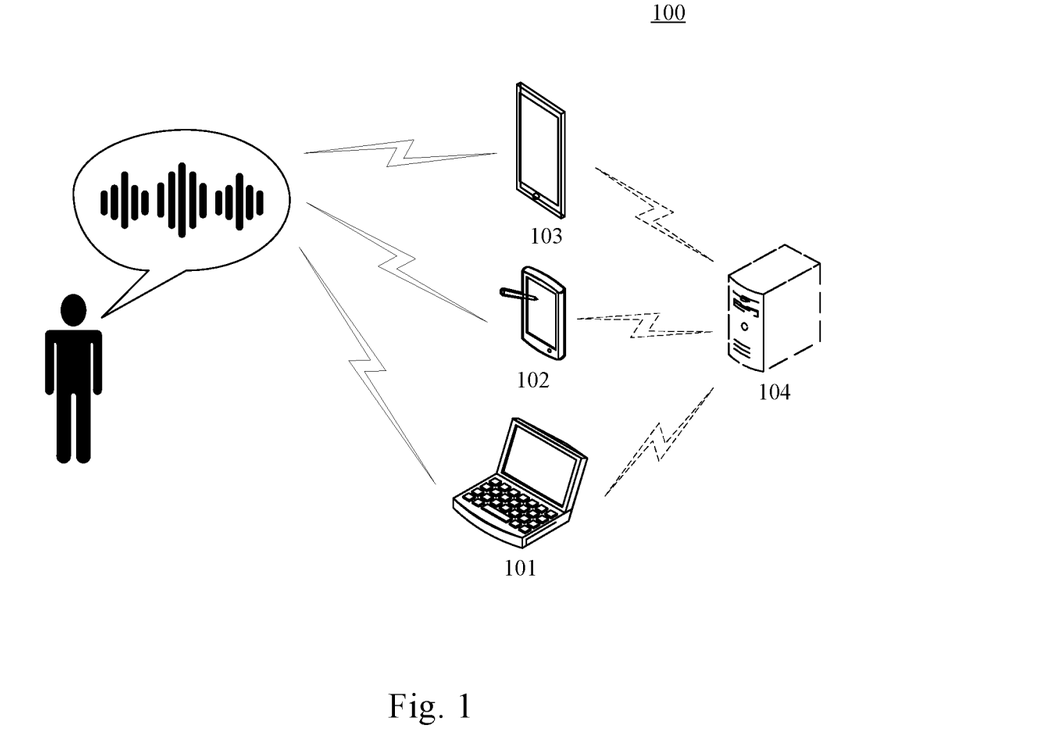
FIG. 1 is an architectural diagram of an exemplary system in which the present application may be implemented.

FIG. 1 shows an exemplary architecture of a system 100 which may be used by a voice recognition method or a voice recognition apparatus according to an embodiment of the present application.

As shown in FIG. 1, the system architecture 100 may include terminal devices 101, 102 and 103, and a server 104. In addition, the above system architecture 100 may also include a network serving as a medium providing a communication link between the terminal devices 101, 102 and 103 and the server 104. The network may include various types of connections, such as wired or wireless transmission links, or optical fibers.

Various electronic parts, such as speakers, microphones and cameras, and various communication client applications, such as voice input applications, web browsing applications, shopping applications, search applications, instant messaging tools, mailbox clients, and social platform software may be installed on the terminal devices 101, 102 and 103.

The terminal devices 101, 102 and 103 may detect the voice signal received by the installed microphone, perform high-pass filtering on the detected voice signal, cancelling an interfering sound signal, perform automatic gain control, and interact with a server 104 through a network, to recognize the processed voice signal. Here, the server 104 may be used to store acoustic models.

The terminal devices 101, 102 and 103 may be various electronic devices having microphones, including but not limited to, smart phones, tablet computers, e-book readers, MP3 (Moving Picture Experts Group Audio Layer III) players, MP4 (Moving Picture Experts Group Audio Layer IV) players, laptop computers and desktop computers.

It should be noted that the terminal devices 101, 102 and 103 may also be used to store the acoustic models directly, and to recognize the processed voice signal. Therefore, it is possible that the terminal devices 101, 102 and 103 do not interact with the server 104. In this event, the server 104 and the network may be omitted in the above system architecture 100.

It should be noted that the voice recognition method according to the embodiments of the present application is generally executed by the terminal devices 101, 102 and 103, and accordingly, a voice recognition apparatus is generally installed on the terminal devices 101, 102 and 103.

It should be appreciated that the numbers of the terminal devices, the networks and the servers in FIG. 1 are merely illustrative. Any number of terminal devices, networks and servers may be provided based on the actual requirements.

Figure 2:
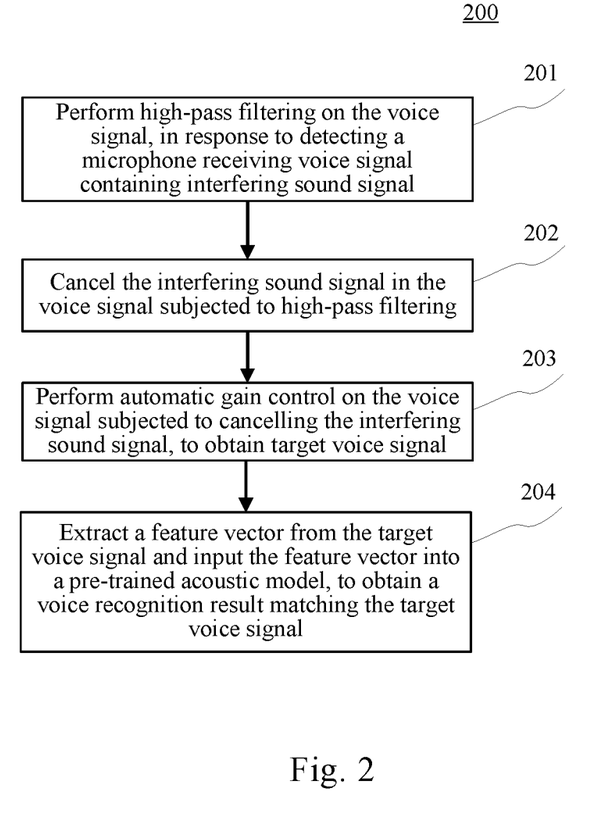
FIG. 2 is a flow chart of a voice recognition method according to an embodiment of the present application.

Referring to FIG. 2, showing a flow 200 of a voice recognition method for a terminal device according to an embodiment of the present application. The voice recognition method includes the following steps.

Step 201: In response to detecting a microphone receiving a voice signal containing an interfering sound signal, perform high-pass filtering on the voice signal.

In this embodiment, an electronic device (for example, the terminal device 101, 102, or 103 shown in FIG. 1) on which the voice recognition method is run may be equipped with a sound receiving device. In practice, the sound receiving device may be a sensor that converts an acoustic signal into a corresponding electrical signal, for example, a microphone.

In this embodiment, the above-mentioned electronic device may detect in real time whether the installed microphone receives voice signal based on a voice activity detection (VAD) algorithm. In response to detecting the microphone receiving a voice signal, the electronic device may perform high-pass filtering (HPF) processing on the voice signal, to block or weaken voice signals having frequencies less than a preset frequency threshold (for example, 100 Hz, 200 Hz). Here, an acoustic signal propagated to the microphone through a medium such as air during a user's speech may be used as the voice signal. In addition, since the electronic device may be placed in various environments, the voice signal usually contains interfering sound signals, emitted by environmental sound sources other than the user and propagated to the microphone through a medium such as air.

In practice, the VAD algorithm can be used for recognizing and cancelling long-time silence periods from a sound signal stream; high-pass filtering is a signal filtering method for enabling high-frequency signal having frequencies higher than a set threshold to pass therethrough, while blocking or weakening low-frequency signal having frequencies lower than the set threshold. It should be noted that the VAD algorithm and the high-pass filtering processing method are well-known technologies widely studied and applied at present, and will not be described here again.

Step 202: Cancel the interfering sound signal in the voice signal subjected to high-pass filtering.

In this embodiment, the above-mentioned electronic device may cancel the interfering sound signal in the voice signal subjected to high-pass filtering in various manners.

In some optional implementations of this embodiment, the above-mentioned interfering sound signal may be a noise signal. In practice, noise signals may exist in various environments, for example, public places, running vehicles, and white noise may exist even in a quiet environment. The above-mentioned electronic device may cancel the noise signal in the voice signal subjected to high-pass filtering using various noise suppression algorithms. As an example, the noise suppression algorithm may be a least mean square (LMS) filtering algorithm, a Lyapunov active noise control algorithm.

In some optional implementations of this embodiment, the above-mentioned electronic device may be equipped with a loudspeaker. In the case that the user plays music using the electronic device or plays a sound (for example, a navigation voice or a news reading and broadcasting voice) using a text to speech (TTS) playing function of the electronic device, the sound emitted by the above-mentioned loudspeaker may be transmitted to the above-mentioned microphone through a medium such as air to form an acoustic echo. At this time, the above-mentioned interfering sound signal may be an echo signal, the echo signal being a sound signal sent by the loudspeaker and transmitted to the microphone. The above-mentioned electronic device may cancel the echo signal in the voice signal subjected to high-pass filtering using an acoustic echo cancellation (AEC) technology. Specifically, the electronic device may perform the following steps. First, perform high-pass filtering on a sound signal emitted by the above-mentioned loudspeaker, to block or weaken sound signal having frequencies less than the above-mentioned preset frequency threshold. Afterwards, calculate a time delay between sending the sound signal by the loudspeaker and receiving the echo signal by the microphone using various time delay estimation (TDE) algorithms (for example, a generalized cross-correlation function method, a least mean square adaptive filtering method, a cross-power-spectrum phase method, a bispectrum time delay estimation method based on high-order statistics), and perform time delay compensation on the echo signal received by the microphone. Finally, perform adaptive filtering on the voice signal subjected to high-pass filtering, to cancel the echo signal in the voice signal subjected to high-pass filtering. It should be noted that the above-mentioned noise suppression algorithms, echo cancellation technology, and time delay estimation algorithms are well-known technologies widely studied and applied at present, and will not be described here again.

In some optional implementations of this embodiment, the above-mentioned interfering sound signal may include the above-mentioned echo signal and the above-mentioned noise signal. The above-mentioned electronic device may first perform adaptive filtering on voice signal subjected to high-pass filtering using a time delay estimation algorithm, to cancel an echo signal. The noise signal in the voice signal subjected to adaptive filtering may be cancelled afterwards using a noise cancellation algorithm.

Step 203: Perform automatic gain control on the voice signal subjected to cancelling the interfering sound signal, to obtain a target voice signal.

In this embodiment, the above-mentioned electronic device may perform automatic gain control (AGC) on the voice signal subjected to cancelling the interfering sound signal, and determine a voice signal obtained after automatic gain control as target a voice signal. Specifically, when the strength of a voice signal subjected to cancelling the interfering sound signal is less than a preset minimum amplitude threshold, the electronic device may increase the amplitude of the voice signal; and when the amplitude of a voice signal subjected to cancelling the interfering sound signal is greater than a preset maximum amplitude threshold, the electronic device may reduce the amplitude of the voice signal. In practice, AGC is an automatic control method for adjusting the gain automatically with a signal amplitude, and can automatically control the amplitude of the gain by changing a signal input/output compression ratio.

In some optional implementations of this embodiment, after performing AGC on the voice signal subjected to cancelling the interfering sound signal, the above-mentioned electronic device may further perform dynamic range control (DRC) on a voice signal having amplitudes less than a preset amplitude, to map the range of the amplitudes of the voice signal to a preset amplitude range, and determine a voice signal obtained after DRC as a target voice signal.

It should be noted that the above-mentioned AGC method and DRC method are well-known technologies widely studied and applied at present, and will not be described here again.

Step 204: Extract a feature vector from the target voice signal and input the feature vector into a pre-trained acoustic model, to obtain a voice recognition result matching the target voice signal.

In this embodiment, the above-mentioned electronic device may first extract a feature vector from the above-mentioned target voice signal using various acoustic feature extraction methods; and afterwards, input the feature vector into a pre-trained acoustic model, to obtain a voice recognition result matching the target voice signal. The acoustic model can be used for representing a corresponding relationship between the feature vector and the voice recognition result. It should be noted that the above-mentioned feature vector may contain multiple values; the above-mentioned voice recognition result may be a voice recognition identifier for distinguishing information such as phonemes, syllables, morphemes, or phoneme states, and the voice identifier may be represented in various forms such as alphabets, numbers, symbols, or texts. It should be pointed out that the above-mentioned acoustic model may be established based on various models such as a hidden Markov model (HMM), a recurrent neural network (RNN), or a deep neural network (DNN), or may be established based on a combination of multiple models. As an example, to establish the acoustic model based on a hidden Markov model, first, statistics may be collected on pronunciation probabilities of texts, and an expression probability matrix of hidden states, where the hidden states may be text sequences corresponding to a voice signal; afterwards, statistics are collected on transition probabilities of words, a transition probability matrix is established, and a hidden Markov model is obtained based on the expression probability matrix of the hidden states; then, the hidden Markov model may be evaluated using a forward algorithm and so on, and a machine learning method is used for training to determine parameters of the hidden Markov model, to obtain the above-mentioned acoustic model.

In some optional implementations of this embodiment, the above-mentioned electronic device may extract feature vector from the above-mentioned target voice signal based on a Mel frequency cepstrum coefficient (MFCC). Specifically, the electronic device may first convert the target voice signal from a time domain to a frequency domain using a fast algorithm of discrete Fourier transform (fast Fourier transformation, FFT), to obtain energy frequencies; afterwards, the electronic device may perform convolution computation on the energy frequency spectrum of the target voice signal using a triangular band-pass filtering method and according to Mel scale distribution, to obtain multiple output logarithmic energies, and finally perform discrete cosine transform (DCT) on vectors formed by the multiple output logarithmic energies, to generate a feature vector.

In some optional implementations of this embodiment, before extracting the feature vector from the above-mentioned target voice signal based on the MFCC, the above-mentioned electronic device may further perform processing such as pre-emphasis or windowing on the target voice signal. In practice, since the target voice signal is a non-stationary signal, in order to process the target voice signal, it is further required to divide the target voice signal by short time periods each of one frame. Each frame may be of a preset duration, for example, 20 ms, 25 ms, 30 ms, or the like.

In some optional implementations of this embodiment, the above-mentioned electronic device may further use a linear predictive coding (LPC) method to parse the above-mentioned target voice signal to generate parameters of a channel excitation and transfer function, and use the generated parameters as feature parameters to generate the feature vector.

Figure 3:
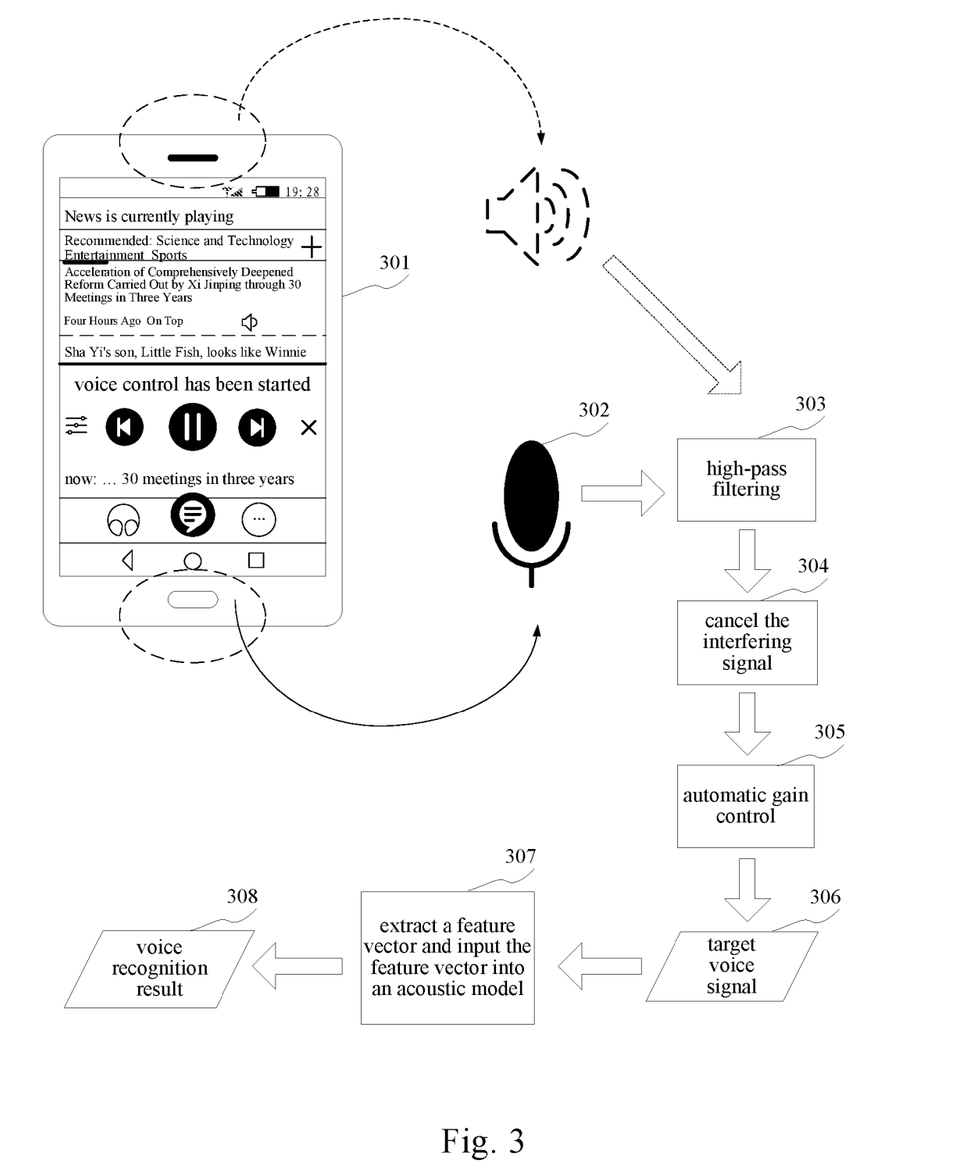
FIG. 3 is a schematic diagram of an application scenario of the voice recognition method according to the present application.

Referring to FIG. 3, which is a schematic diagram of an application scenario of the voice recognition method according to this embodiment. In the application scenario of FIG. 3, a mobile phone terminal 301 is equipped with a microphone 302, and upon detecting the microphone 301 receiving a voice signal containing interfering sound signal, the mobile phone terminal 301 performs high-pass filtering on the detected voice signal (indicated by the reference sign 303); afterwards, cancels the interfering sound signal in the voice signal subjected to high-pass filtering (indicated by the reference sign 304); then, performs automatic gain control on the voice signal subjected to cancelling the interfering sound signal (indicated by the reference sign 305), to obtain a target voice signal 306; and finally, the mobile phone terminal 301 extracts a feature vector from the target voice signal 306 and inputs the feature vector into a pre-trained acoustic model (indicated by the reference sign 307), to obtain a voice recognition result 308 matching the target voice signal.

According to the method provided in the above-mentioned embodiment of the present application, high-pass filtering, cancellation of an interfering sound signal, and automatic gain control are sequentially performed on a voice signal, to obtain a target voice signal, and afterwards, a feature vector is extracted from the target voice signal, and the feature vector is inputted into a pre-trained acoustic model, to obtain a voice recognition result matching the target voice signal, thereby improving the success rate of voice recognition.

Figure 4:
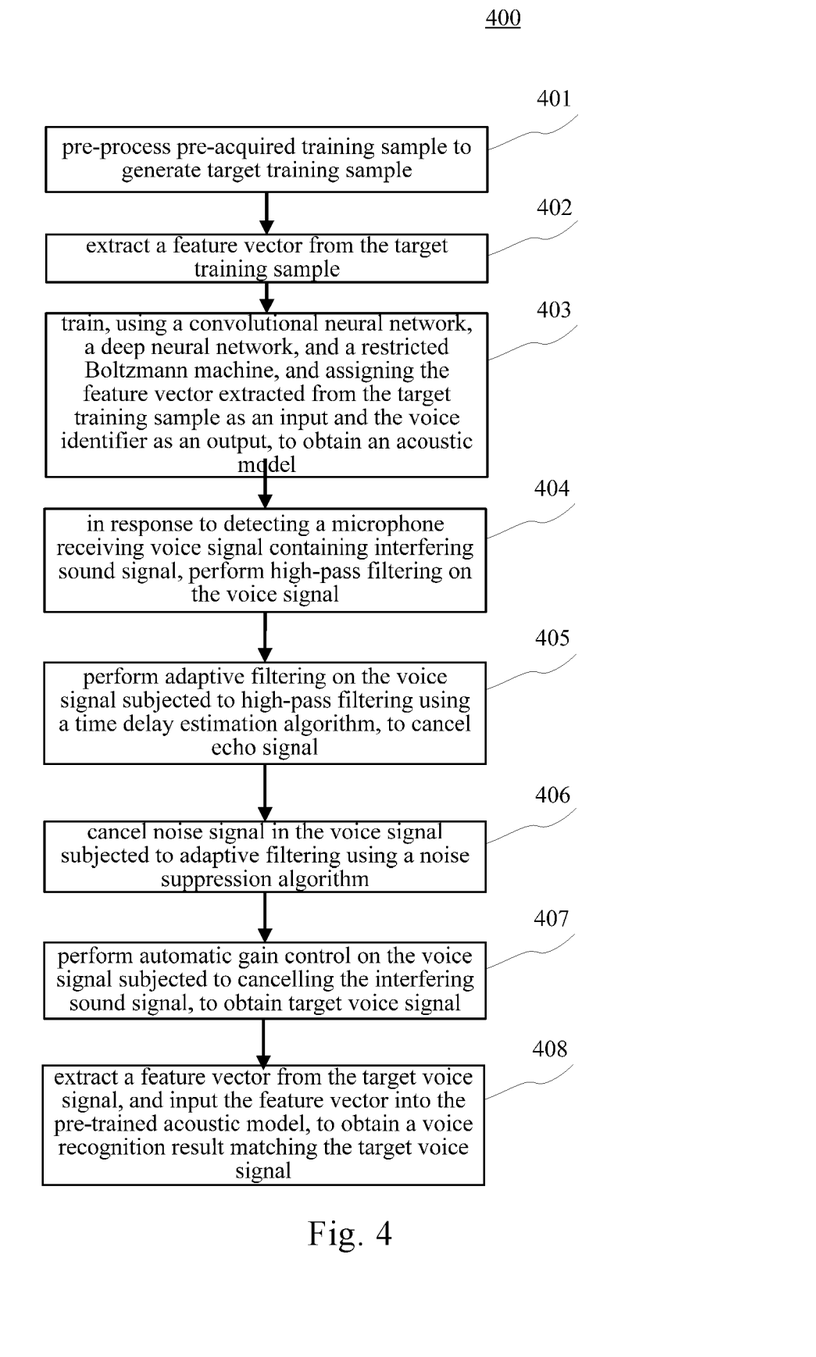
FIG. 4 is a flow chart of a voice recognition method according to another embodiment of the present application.

Further referring to FIG. 4, showing a flow 400 of a voice recognition method according to another embodiment. The flow 400 of the voice recognition method includes the following steps.

Step 401: Pre-process a pre-acquired training sample to generate a target training sample.

In this embodiment, an electronic device (for example, the terminal device 101, 102, or 103 shown in FIG. 1) on which the voice recognition method is run may pre-acquire a training sample that may be a large number of a pre-collected voice signal. It should be noted that the large number of a voice signal may contain a noise signal and/or an echo signal. It should be pointed out that the above-mentioned target training sample may include a voice identifier. In practice, the voice identifier may be an identifier for distinguishing phonemes, syllables, morphemes, or phoneme states, and the voice identifier may be represented in various forms such as alphabets, numbers, symbols, or texts.

In this embodiment, the above-mentioned electronic device may pre-process the above-mentioned training sample according to the following steps. First, perform high-pass filtering on a pre-acquired training sample, to block or weaken a voice signal having frequencies less than a preset frequency threshold. Afterwards, the electronic device may perform echo cancellation and noise suppression on the training sample subjected to high-pass filtering sequentially using an echo cancellation technology and a noise suppression algorithm, to cancel an interfering sound signal in the training sample. It should be noted that the cancellation of the interfering sound signal may also be weakening or suppression of the interfering sound signal. Finally, the electronic device may perform automatic gain control on the training sample subjected to noise suppression, and determine a training sample obtained after automatic gain control as a target training sample.

Step 402: Extract a Feature Vector from the Target Training Sample.

In this embodiment, the above-mentioned electronic device may first perform processing such as pre-emphasis, framing, or windowing on the above-mentioned target training sample, and afterwards, extract a feature vector from the above-mentioned target voice signal based on an MFCC. Specifically, the electronic device may first convert the target training sample from a time domain to a frequency domain using a fast algorithm of discrete Fourier transform, to obtain energy frequencies; afterwards, the electronic device may perform convolution computation on the energy frequency spectrum of the target training sample using a triangular band-pass filtering method and according to Mel scale distribution, to obtain multiple output logarithmic energies, and finally perform discrete cosine transform on vectors formed by the multiple output logarithmic energies, to generate a feature vector.

Step 403: Train, using a convolutional neural network, a deep neural network, and a restricted Boltzmann machine, and assigning the feature vector extracted from the target training sample as an input and the voice identifier as an output, to obtain an acoustic model.

In this embodiment, first, a multi-layer neural network model may be established using a convolutional neural network and using an S-function (namely, a sigmoid function) as a non-linear activation function. Afterwards, the above-mentioned electronic device may train the established multi-layer neural network model using the feature vector extracted from the above-mentioned target training sample as an input and the above-mentioned voice identifier as an output and using a restricted Boltzmann machine (RBM), to obtain an acoustic model. In practice, the above-mentioned neural network model may include an input layer, a convolutional layer, a pooling layer, a fully-connected layer, and an output layer, and the above-mentioned convolutional neural network may include multiple convolutional layers and multiple pooling layers. The above-mentioned restricted Boltzmann machine is a randomly generated neural network capable of learning probability distribution through input data sets. The restricted Boltzmann machine may consist of a visible neuron layer and a hidden neuron layer, the hidden layer of neurons are not interconnected, and the hidden layer of neurons are independent of the above-mentioned target training sample, and the visible layer of neurons are also not interconnected. A Markov chain sampling process is performed on the states of the hidden layer of neurons obtained from the target training sample, to estimate expected value independent of data, and values of all the visible layer of neurons and the hidden layer of neurons are updated alternately in parallel. It should be noted that the above-mentioned convolutional neural network and restricted Boltzmann machine are well-known technologies widely studied and applied at present, and will not be described here again.

In this embodiment, after the above-mentioned acoustic model is obtained, a voice identifier outputted by the acoustic model may be further clustered using various clustering algorithms, and a voice identifier obtained after clustering are determined as a voice recognition result matching the above-mentioned training sample. As an example, the voice identifier outputted by the acoustic model may be clustered based on a relative entropy (Kullback-Leibler Divergence, KLD), a hierarchical clustering algorithm, a self-organizing map (SOM) clustering algorithm, a fuzzy c-means (FCM) clustering algorithm, and so on.

It should be noted that the above-mentioned acoustic model may be stored in the above-mentioned electronic device, or may be stored in a server (for example, the server 104 shown in FIG. 1) connected to the electronic device.

Step 404: In response to detecting a microphone receiving a voice signal containing an interfering sound signal, perform high-pass filtering on the voice signal.

In this embodiment, the above-mentioned electronic device may be equipped with a microphone and a loudspeaker. The electronic device may detect in real time whether the installed microphone receives a voice signal based on a VAD algorithm. In response to detecting the microphone receiving a voice signal, the electronic device may perform high-pass filtering on the voice signal received by the microphone, to block or weaken a voice signal having frequencies less than the above-mentioned preset frequency threshold in step 401. It should be noted that the voice signal received by the microphone may contain an interfering sound signal including the above-mentioned echo signal and the above-mentioned noise signal, where the echo signal contained in the voice signal received by the microphone may be a sound signal sent by the above-mentioned loudspeaker and transmitted to the microphone.

Step 405: Perform adaptive filtering on the voice signal subjected to high-pass filtering using a time delay estimation algorithm, to cancel an echo signal.

In this embodiment, the above-mentioned electronic device may first perform high-pass filtering on a sound signal emitted by the above-mentioned loudspeaker, to block or weaken a voice signal having frequencies less than the above-mentioned preset frequency threshold. Afterwards, a time delay between sending the sound signal by the loudspeaker and receiving a corresponding echo signal by the above-mentioned microphone may be calculated using a time delay estimation algorithm, and time delay compensation is performed on the echo signal received by the microphone. Finally, adaptive filtering is performed on the voice signal subjected to high-pass filtering, to cancel an echo signal in the voice signal subjected to high-pass filtering.

Step 406: Cancel noise signal in the voice signal subjected to adaptive filtering using a noise suppression algorithm.

In this embodiment, the above-mentioned noise signal may be a white noise existing in the environment. The above-mentioned electronic device may cancel a noise signal in the voice signal subjected to high-pass filtering using a noise suppression algorithm.

Step 407: Perform automatic gain control on the voice signal subjected to cancelling the interfering sound signal, to obtain a target voice signal.

In this embodiment, the above-mentioned electronic device may perform automatic gain control on the voice signal subjected to cancelling the interfering sound signal, and determine a voice signal obtained after automatic gain control as a target voice signal.

Step 408: Extract a feature vector from the target voice signal, and input the feature vector into the pre-trained acoustic model, to obtain a voice recognition result matching the target voice signal.

In this embodiment, the above-mentioned electronic device may extract a feature vector from the above-mentioned target voice signal based on an MFCC. Afterwards, the extracted feature vector are inputted into the acoustic model trained in step 402, to obtain a voice recognition result matching the above-mentioned target voice signal.

It should be noted that the concrete operation of the above-mentioned step 405 to step 408 is basically the same as the concrete operation of step 201 to step 204, and will not be described here again.

It can be seen from FIG. 4 that as compared with the embodiment corresponding to FIG. 4, the flow 400 of the voice recognition method according to in this embodiment emphasizes the step of pre-processing the training sample of the acoustic model. Therefore, the solution described in this embodiment can reduce the difference between the training sample used for training the acoustic model and the actual voice signal received by the microphone, thereby further improving the success rate of voice recognition.

Figure 5:
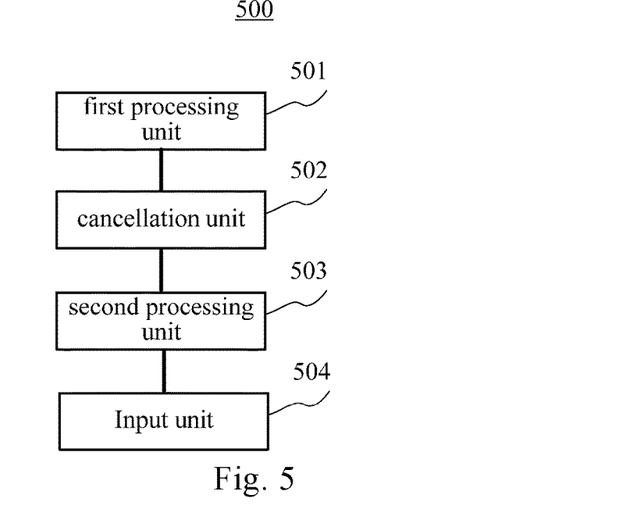
FIG. 5 is a schematic structural diagram of a voice recognition apparatus according to an embodiment of the present application.

Further referring to FIG. 5, as an implementation of the methods shown in the above-mentioned figures, the present application provides an embodiment of a voice recognition apparatus. The apparatus embodiment corresponds to the method embodiment shown in FIG. 2. The apparatus may be specifically applied to various electronic devices.

As shown in FIG. 5, the voice recognition apparatus 500 of this embodiment includes: a first processing unit 501, configured to, in response to detecting the above-mentioned microphone receiving voice signal containing an interfering sound signal, perform high-pass filtering on the voice signal; a cancellation unit 502, configured to cancel the interfering sound signal in the voice signal subjected to high-pass filtering; a second processing unit 503, configured to perform automatic gain control on the voice signal subjected to cancelling the interfering sound signal, to obtain a target voice signal; and an input unit 504, configured to extract a feature vector from the target voice signal and input the feature vector into a pre-trained acoustic model, to obtain a voice recognition result matching the target voice signal, the acoustic model being used for representing a corresponding relationship between the feature vector and the voice recognition result.

In this embodiment, the voice recognition apparatus 500 may be equipped with a microphone. The first processing unit 501 of the voice recognition apparatus 500 may detect in real time whether the installed microphone receives a voice signal based on a VAD algorithm. In response to detecting the microphone receiving a voice signal, the first processing unit 501 may perform high-pass filtering on the voice signal, to block or weaken a voice signal having frequencies less than a preset frequency threshold. Since the above-mentioned electronic device may be in various environments, the voice signal usually contain an interfering sound signal.

In this embodiment, the above-mentioned cancellation unit 502 may cancel the interfering sound signal in the voice signal subjected to high-pass filtering in various manners. In response to the interfering sound signal being noise signal, the cancellation unit 502 may cancel the noise signal in the voice signal subjected to high-pass filtering using an NS algorithm. In response to the interfering sound signal being an echo signal, the cancellation unit 502 may cancel the echo signal in the voice signal subjected to high-pass filtering using an AEC technology.

In some optional implementations of this embodiment, the above-mentioned voice recognition apparatus 500 is further equipped with a loudspeaker, the interfering sound signal includes an echo signal and a noise signal, and the echo signal is sound signal sent by the loudspeaker and transmitted to the above-mentioned microphone.

In some optional implementations of this embodiment, the above-mentioned cancellation unit 502 may further include a first cancellation module and a second cancellation module (not shown). The first cancellation module may be configured to perform adaptive filtering on the voice signal subjected to high-pass filtering using a time delay estimation algorithm, to cancel an echo signal; and the second cancellation module may be configured to cancel a noise signal in the voice signal subjected to adaptive filtering using a noise suppression algorithm.

In this embodiment, the second unit 503 may perform automatic gain control on the voice signal subjected to cancelling the interfering sound signal, and determine a voice signal obtained after automatic gain control as a target voice signal. Specifically, when the strength of a voice signal subjected to cancelling the interfering sound signal is less than a preset minimum amplitude threshold, the above-mentioned electronic device may increase the amplitude of the voice signal. When the amplitude of a voice signal subjected to cancelling the interfering sound signal is greater than a preset maximum amplitude threshold, the above-mentioned electronic device may reduce the amplitude of the voice signal.

In this embodiment, the input unit 504 may first extract a feature vector from the above-mentioned target voice signal using various acoustic feature extraction methods; and afterwards, input the feature vector into a pre-trained acoustic model, to obtain a voice recognition result matching the target voice signal. The acoustic model can be used for representing a corresponding relationship between the feature vector and the voice recognition result.

In some optional implementations of this embodiment, the above-mentioned voice recognition apparatus 500 may further include a pre-processing unit, an extraction unit, and a training unit (not shown). The pre-processing unit may be configured to pre-process a pre-acquired training sample to generate a target training sample, the target training sample including a voice identifier; the extraction unit may be configured to extract a feature vector from the target training sample; and the training unit may be configured to train, using a convolutional neural network, a deep neural network, and a restricted Boltzmann machine, and assigning the feature vector extracted from the target training sample as an input and the voice identifier as an output, to obtain the above-mentioned acoustic model.

In some optional implementations of this embodiment, the above-mentioned pre-processing unit may further include a first processing module, a second processing module, and a third processing module (not shown). The first processing module may be configured to perform high-pass filtering on the pre-acquired training sample; the second processing module may be configured to perform sequentially echo cancellation and noise suppression on the training sample subjected to high-pass filtering; and the third processing module may be configured to perform automatic gain control on the training sample subjected to noise suppression, to generate the target training sample.

In some optional implementations of this embodiment, the above-mentioned voice recognition apparatus 500 may further include a clustering unit (not shown). The clustering unit is configured to cluster the voice identifier outputted by the acoustic model using a clustering algorithm, and determine a voice identifier obtained after clustering as a voice recognition result matching the above-mentioned training sample.

According to the apparatus provided in the above-mentioned embodiment of the present application, the first processing unit 501, the cancellation unit 502, and the second processing unit 503 respectively perform sequentially high-pass filtering, cancellation of an interfering sound signal, and automatic gain control on voice signal, to obtain a target voice signal, and afterwards, the input unit 504 extracts a feature vector from the target voice signal and inputs the feature vector into a pre-trained acoustic model, to obtain a voice recognition result matching the target voice signal, thereby improving the success rate of voice recognition.

Figure 6:
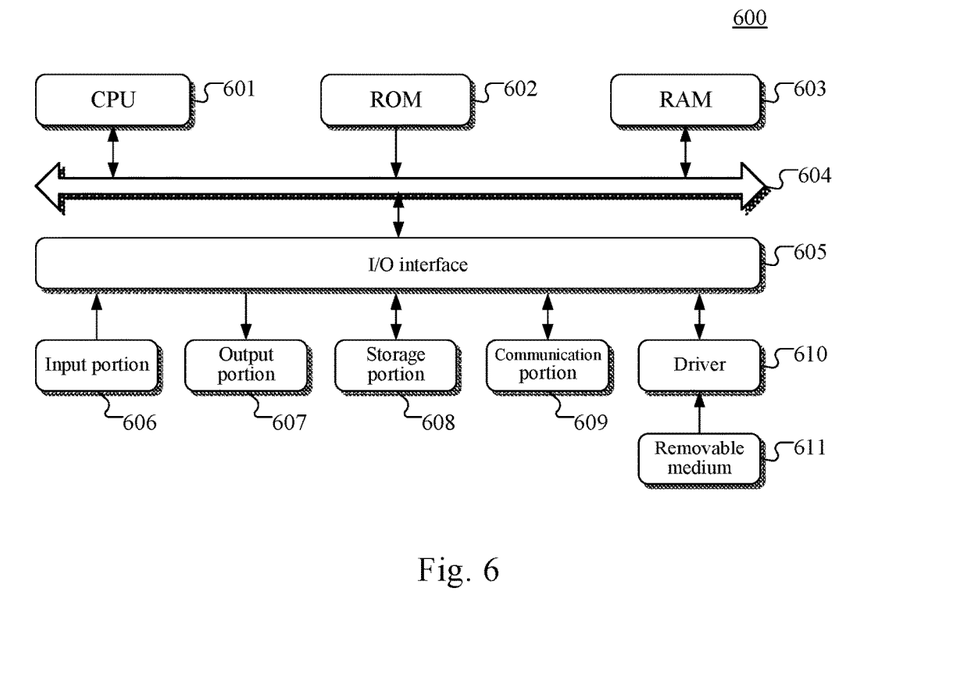
FIG. 6 is a structural schematic diagram of a computer system adapted to implement a terminal device of the embodiments of the present application

Referring to FIG. 6, a schematic structural diagram of a computer system 600 adapted to implement a terminal apparatus of the embodiments of the present application is shown.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to an embodiment of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the CPU 601, implements the functions as defined by the methods of the present disclosure.

The flowcharts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

The units or modules involved in the embodiments of the present application may be implemented by way of software or hardware. The described units or modules may also be provided in a processor, for example, described as: a processor, comprising a first processing unit, a cancellation unit, a second processing unit and an input unit, where the names of these units or modules are not considered as a limitation to the units or modules. For example, the first unit may also be described as "a unit for performing high-pass filtering."

In another aspect, the present application further provides a non-volatile computer storage medium. The non-volatile computer storage medium may be the non-volatile computer storage medium included in the apparatus in the above embodiments, or a stand-alone non-volatile computer storage medium which has not been assembled into the apparatus. The non-volatile computer storage medium stores one or more programs. The one or more programs, when executed by a device, cause the device to: perform high-pass filtering on a voice signal, in response to detecting the microphone receiving the voice signal containing interfering sound signal; cancel the interfering sound signal in the voice signal subjected to high-pass filtering; perform automatic gain control on the voice signal subjected to cancelling the interfering sound signal, to obtain target voice signal; and extract a feature vector from the target voice signal and inputting the feature vector into a pre-trained acoustic model, to obtain a voice recognition result matching the target voice signal, the acoustic model being used for representing a corresponding relationship between the feature vector and the voice recognition result.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A voice recognition method for a terminal device, the terminal device being equipped with a microphone, the method comprising:
   performing high-pass filtering on a voice signal, in response to detecting the microphone receiving the voice signal containing interfering sound signal;
   cancelling the interfering sound signal in the voice signal subjected to high-pass filtering;
   performing automatic gain control on the voice signal subjected to cancelling the interfering sound signal, to obtain target voice signal; and
   extracting a feature vector from the target voice signal and inputting the feature vector into a pre-trained acoustic model, to obtain a voice recognition result matching the target voice signal, the acoustic model being used for representing a corresponding relationship between the feature vector and the voice recognition result, wherein before the performing high-pass filtering on the voice signals, in response to detecting the microphone receiving the voice signal, the method further comprises:
   pre-processing a pre-acquired training sample to generate a target training sample, the target training sample comprising a voice identifier;
   extracting the feature vector from the target training sample; and
   training, using a convolutional neural network, a deep neural network, and a restricted Boltzmann machine, and assigning the feature vector extracted from the target training sample as an input and the voice identifier as an output, to obtain the acoustic model.

2. The voice recognition method according to claim 1, wherein the terminal device is further equipped with a loudspeaker, the interfering sound signal comprises an echo signal and a noise signal, and the echo signal is a sound signal sent by the loudspeaker and transmitted to the microphone.

3. The voice recognition method according to claim 2, wherein the cancelling the interfering sound signal in the voice signal to obtain target voice signal comprises:
   performing adaptive filtering on the voice signal subjected to high-pass filtering using a time delay estimation algorithm, to cancel the echo signal; and cancelling the noise signal in the voice signal subjected to adaptive filtering using a noise suppression algorithm.

4. The voice recognition method according to claim 1, wherein the pre-processing a pre-acquired training sample to generate a target training sample comprises:
   performing high-pass filtering on the pre-acquired training sample;
   performing sequentially echo cancellation and noise suppression on the training sample subjected to high-pass filtering; and
   performing automatic gain control on the training sample subjected to noise suppression, to generate the target training sample.

5. The voice recognition method according to claim 1, wherein before the performing high-pass filtering on the voice signals, in response to detecting the microphone receiving a voice signal, the method further comprises:
   clustering the voice identifier outputted by the acoustic model using a clustering algorithm, and determining voice identifier obtained after clustering as a voice recognition result matching the training sample.

6. A voice recognition apparatus for a terminal device, the terminal device being equipped with a microphone, the apparatus comprising:
   at least one processor; and
   a memory storing instructions, which when executed by the at least one processor, cause the at least one processor to perform operations, the operations comprising:
   performing high-pass filtering on the voice signal, in response to detecting the microphone receiving voice signal containing interfering sound signal;
   cancelling the interfering sound signal in the voice signal subjected to high-pass filtering;
   performing automatic gain control on the voice signal subjected to cancelling the interfering sound signal, to obtain target voice signal; and
   extracting a feature vector from the target voice signal and input the feature vector into a pre-trained acoustic model, to obtain a voice recognition result matching the target voice signal, the acoustic model being used for representing a corresponding relationship between the feature vector and the voice recognition result, wherein before the performing high-pass filtering on the voice signals, in response to detecting the microphone receiving the voice signal, the operations further comprise:
   pre-processing a pre-acquired training sample to generate a target training sample, the target training sample comprising a voice identifier;
   extracting the feature vector from the target training sample; and
   training, using a convolutional neural network, a deep neural network, and a restricted Boltzmann machine, and assigning the feature vector extracted from the target training sample as an input and the voice identifier as an output, to obtain the acoustic model.

7. The voice recognition apparatus according to claim 6, wherein the terminal device is further equipped with a loudspeaker, the interfering sound signal comprises an echo signal and a noise signal, and the echo signal is a sound signal sent by the loudspeaker and transmitted to the microphone.

8. The voice recognition apparatus according to claim 7, wherein the cancelling the interfering sound signal in the voice signal to obtain target voice signal comprises:
   performing adaptive filtering on the voice signal subjected to high-pass filtering using a time delay estimation algorithm, to cancel the echo signal; and
   cancelling the noise signal in the voice signal subjected to adaptive filtering using a noise suppression algorithm.

9. The voice recognition apparatus according to claim 6, wherein the pre-processing a pre-acquired training sample to generate a target training sample comprises:
   performing high-pass filtering on the pre-acquired training sample;
   performing sequentially echo cancellation and noise suppression on the training sample subjected to high-pass filtering; and
   performing automatic gain control on the training sample subjected to noise suppression, to generate the target training sample.

10. The voice recognition apparatus according to claim 6, wherein the before the performing high-pass filtering on the voice signals, in response to detecting the microphone receiving a voice signal, the operations further comprise:
    clustering the voice identifier outputted by the acoustic model using a clustering algorithm, and determine a voice identifier obtained after clustering as a voice recognition result matching the training sample.

11. A non-transitory computer storage medium storing a computer program, which when executed by one or more processors, cause the one or more processors to perform operations, the operations comprising:
    performing high-pass filtering on a voice signal, in response to detecting the microphone receiving the voice signal containing interfering sound signal;
    cancelling the interfering sound signal in the voice signal subjected to high-pass filtering;
    performing automatic gain control on the voice signal subjected to cancelling the interfering sound signal, to obtain target voice signal; and
    extracting a feature vector from the target voice signal and inputting the feature vector into a pre-trained acoustic model, to obtain a voice recognition result matching the target voice signal, the acoustic model being used for representing a corresponding relationship between the feature vector and the voice recognition result, wherein before the performing high-pass filtering on the voice signals, in response to detecting the microphone receiving the voice signal, the operations further comprise:
    pre-processing a pre-acquired training sample to generate a target training sample, the target training sample comprising a voice identifier;
    extracting the feature vector from the target training sample; and
    training, using a convolutional neural network, a deep neural network, and a restricted Boltzmann machine, and assigning the feature vector extracted from the target training sample as an input and the voice identifier as an output, to obtain the acoustic model.

12. The non-transitory computer storage medium according to claim 11, wherein the terminal device is further equipped with a loudspeaker, the interfering sound signal comprises an echo signal and a noise signal, and the echo signal is a sound signal sent by the loudspeaker and transmitted to the microphone.

13. The non-transitory computer storage medium according to claim 12, wherein the cancelling the interfering sound signal in the voice signal to obtain target voice signal comprises:

performing adaptive filtering on the voice signal subjected to high-pass filtering using a time delay estimation algorithm, to cancel the echo signal; and cancelling the noise signal in the voice signal subjected to adaptive filtering using a noise suppression algorithm.

14. The non-transitory computer storage medium according to claim 11, wherein the pre-processing a pre-acquired training sample to generate a target training sample comprises:

performing high-pass filtering on the pre-acquired training sample;

performing sequentially echo cancellation and noise suppression on the training sample subjected to high-pass filtering; and performing automatic gain control on the training sample subjected to noise suppression, to generate the target training sample.

15. The non-transitory computer storage medium according to claim 11, wherein before the performing high-pass filtering on the voice signals, in response to detecting the microphone receiving a voice signal, the operations further comprise:

clustering the voice identifier outputted by the acoustic model using a clustering algorithm, and determining voice identifier obtained after clustering as a voice recognition result matching the training sample.

* * * * *